Aug. 19, 1930.  P. W. TORNDAHL  1,773,506
PAN FOR SERVING FOOD
Filed June 28, 1929  2 Sheets-Sheet 1
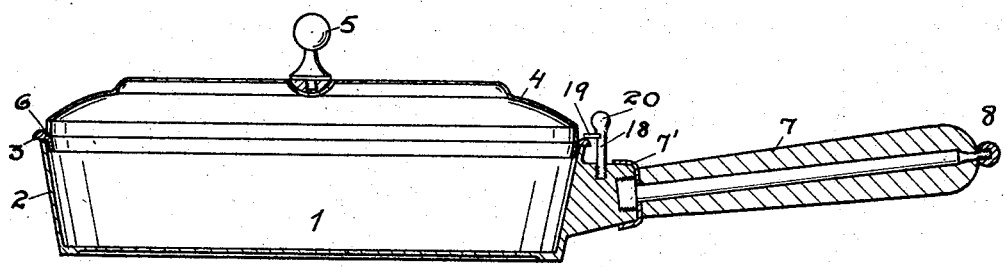
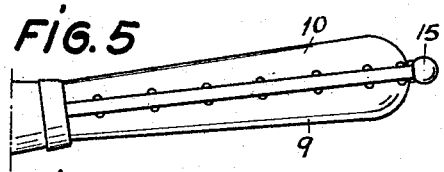
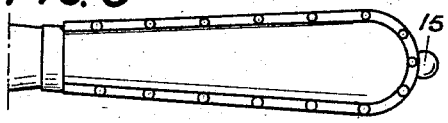
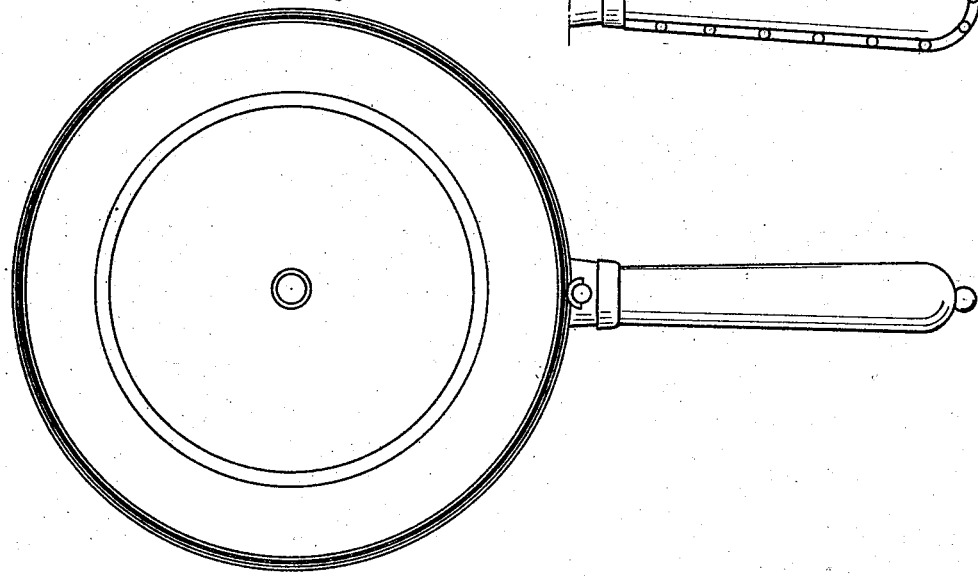
INVENTOR:
Per Wilhelm Torndahl
BY
ATTORNEYS.

Aug. 19, 1930.                P. W. TORNDAHL                1,773,506
                              PAN FOR SERVING FOOD
                      Filed June 28, 1929        2 Sheets-Sheet 2
FIG. 3
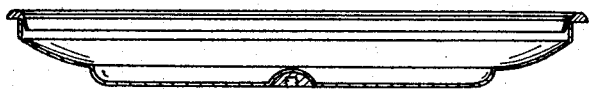
FIG. 4
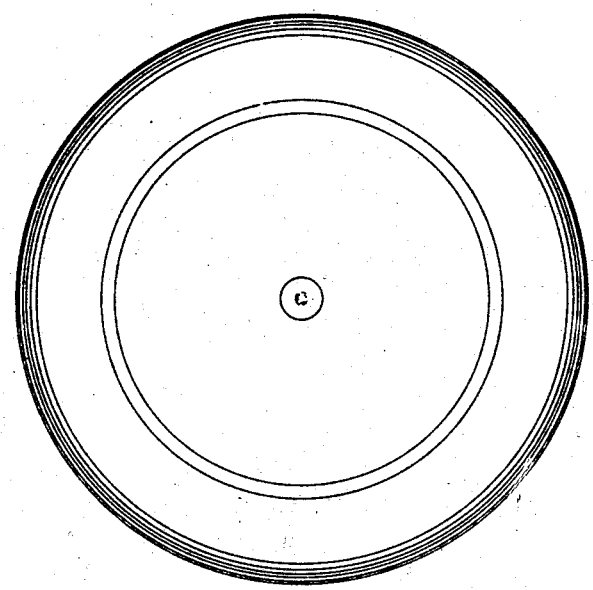
FIG. 9        FIG. 7        FIG. 8
 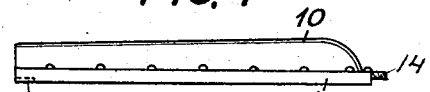 
FIG. 12       FIG. 10       FIG. 11
 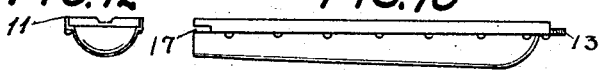 
INVENTOR:
Per Wilhelm Torndahl
BY: Runge, Boyer + Bachelor
    ATTORNEYS.

Patented Aug. 19, 1930

1,773,506

UNITED STATES PATENT OFFICE

PER WILHELM TORNDAHL, OF STOCKHOLM, SWEDEN

PAN FOR SERVING FOOD

Application filed June 28, 1929, Serial No. 374,605, and in Sweden July 9, 1928.

My invention relates to improvements in pans and more particularly pans for serving the dish prepared in the pan directly on the table during the repast. The object of the invention is to increase the scope of use of an ordinary kitchen pan and to make it possible to use such a pan as a serving utensil. This is achieved simply by providing a device for protecting the dish, so arranged as to facilitate the serving of the dish either from the pan itself or from the said protecting device. This object is attained by means of a certain construction of the upper part of the pan, the edge of which is provided with a loose annular rim, which rim carries a cover for the pan, said cover at the same time serving as a plate. The cover and the rim are designed in such a manner, that the rim may be applied on the outer edge of the cover, when the cover in a reversed position shall be used as a plate. Preferably the rim may be secured to the pan by means of a specially designed screw. The handle of the pan may be detachable or may by means of a detachable fastening be secured to the pan.

With the above and other objects in view my invention resides in the novel features of construction and arrangement of parts which will hereinafter be fully described with reference to the accompanying drawings wherein similar characters of reference designate corresponding parts throughout the views, and in which—

Figures 1 and 2 show a pan with rim and cover in longitudinal section and plan view respectively. Figures 3 and 4 in longitudinal section and plan view respectively show the cover with the rim when the cover is serving as a plate. Figures 5 and 6 show a handle in side view and plan view respectively. Figures 7-12 show details.

As shown in Figures 1 and 2 the annular metal rim 3 is placed on the upper edge of the pan thus forming a protective covering for the edge of the pan. In ring 3 there is formed a recess 6 for the metallic cover 4 which is provided with a detachable knob 5, screwed into the cover. The recess 6 is of the same diameter as the edge of the pan. The ring may be placed on the edge of the cover, when the cover is intended to serve as a plate, as shown in Figures 3–4, in which case the knob must be detached. The handle 7 may be detachable, or may, as shown in Figures 1 and 2, be provided with a polished collar 7¹ and a knob 8. According to Figures 5–2, the handle may be provided with an ornamental fitting, consisting of two halves 9, 10, made of pressed or cast material. Said halves are provided with longitudinal edges 11 and 12, fitting in between one another, and at the corresponding end parts there are screw halves 13, 14, forming a threaded pin, upon which there is screwed a knob 15 when the handle is put together. The halves 9, 10 are applied to the shaft of the pan in such a manner, that the hooks 16 of the upper half 10 are forced into the recesses 16 of the lower half 9, after which the halves are secured together by means of knob 15.

The preferred form of my invention has been set forth in the foregoing description, but I do not limit myself thereto, as I am aware that modifications may be made therein without departing from the spirit or sacrificing the advantages thereof, and I therefore reserve right to make such changes as fairly will fall within the scope of the claim. The rim may be made without any special recess for the cover, and may be provided with flanges on both sides of the edge 2 of the pan. The cover may be provided with a certain number of knobs, preferably three, and so arranged as to serve as feet, when the cover is to be used as a plate.

Having thus fully shown and described my invention, what I claim as new and desire to secure by Letters Patent, is—

A cooking and serving utensil, comprising in combination, a pan, a cover having a flange adapted to fit within the top portion of the side wall of said pan thereby to close the same, and a removable protecting rim having at one side thereof an annular recess of approximately the same diameter as the top portion of the pan thereby to receive the flange of said cover, said rim having at its opposite side a flange adapted to fit within the side wall of the pan and when the rim is reversed to fit within the flange of the cover.

In testimony whereof I have signed my name to this specification.

PER WILHELM TORNDAHL.